United States Patent
Kurata et al.

(10) Patent No.: US 11,380,508 B2
(45) Date of Patent: Jul. 5, 2022

(54) ELECTRIC CONNECTION BOX

(71) Applicant: YAZAKI CORPORATION, Tokyo (JP)

(72) Inventors: Sho Kurata, Makinohara (JP); Hideki Kawamura, Makinohara (JP); Minoru Umezaki, Makinohara (JP); Keiichi Sugiyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 312 days.

(21) Appl. No.: 16/786,960

(22) Filed: Feb. 10, 2020

(65) Prior Publication Data

US 2020/0294749 A1 Sep. 17, 2020

(30) Foreign Application Priority Data

Mar. 11, 2019 (JP) .............................. JP2019-044085

(51) Int. Cl.
| | | |
|---|---|---|
| *B60R 16/02* | (2006.01) | |
| *H01H 85/20* | (2006.01) | |
| *B60R 16/023* | (2006.01) | |

(52) U.S. Cl.
CPC ..... *H01H 85/2045* (2013.01); *B60R 16/0238* (2013.01); *B60R 16/0239* (2013.01); *H01H 2085/208* (2013.01)

(58) Field of Classification Search
CPC .......... H01H 85/2045; H01H 2085/208; B60R 16/0238; B60R 16/0239; B60R 16/02; H05K 5/063; H05K 5/03; H05K 5/069; H01R 13/447; H01R 9/24; H01R 13/52; Y10S 439/949
See application file for complete search history.

(56) References Cited

U.S. PATENT DOCUMENTS

| | | | | |
|---|---|---|---|---|
| 8,969,723 B2 * | 3/2015 | Hirasawa | ............... | H02G 3/088 |
| | | | | 439/76.1 |
| 10,391,955 B2 * | 8/2019 | Yamashita | .......... | B60R 16/0238 |
| 2002/0134572 A1 * | 9/2002 | Matsumura | .......... | H01H 85/044 |
| | | | | 174/66 |
| 2006/0089020 A1 * | 4/2006 | Kanamaru | ........... | H01R 13/447 |
| | | | | 439/76.2 |
| 2009/0218129 A1 * | 9/2009 | Taniguchi | .............. | H02G 3/081 |
| | | | | 174/503 |
| 2014/0311793 A1 | 10/2014 | Kaneko et al. | | |

FOREIGN PATENT DOCUMENTS

| | | |
|---|---|---|
| JP | 2009-213193 A | 9/2009 |
| JP | 2013-146125 A | 7/2013 |
| JP | 2013-243858 A | 12/2013 |
| JP | 2017-22824 A | 1/2017 |

* cited by examiner

*Primary Examiner* — Steven T Sawyer
(74) *Attorney, Agent, or Firm* — Kenealy Vaidya LLP

(57) ABSTRACT

An electric connection box includes a housing, a first lid portion, a groove, and a protrusion. The housing includes an opening. The first lid portion includes a first body wall that closes the opening of the housing and a first peripheral wall extending from a periphery of the first body wall toward the housing. The groove is provided between the first peripheral wall and a wall portion arranged to be spaced apart from the first peripheral wall. The groove includes an opening in a side of the first body wall in an extending direction of the first peripheral wall. The protrusion is provided on the first lid portion and protruding toward the wall portion. The protrusion covers the opening of the groove.

6 Claims, 10 Drawing Sheets

FIG.3
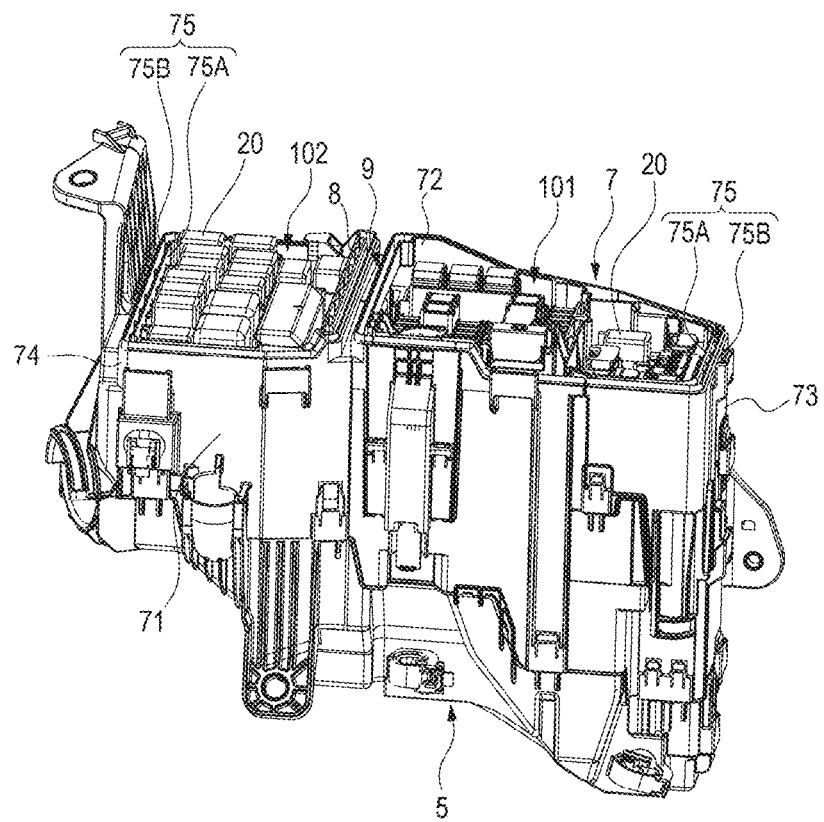
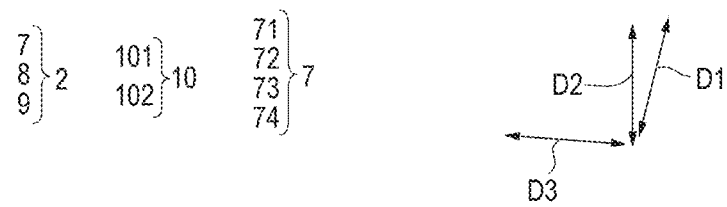

FIG.6
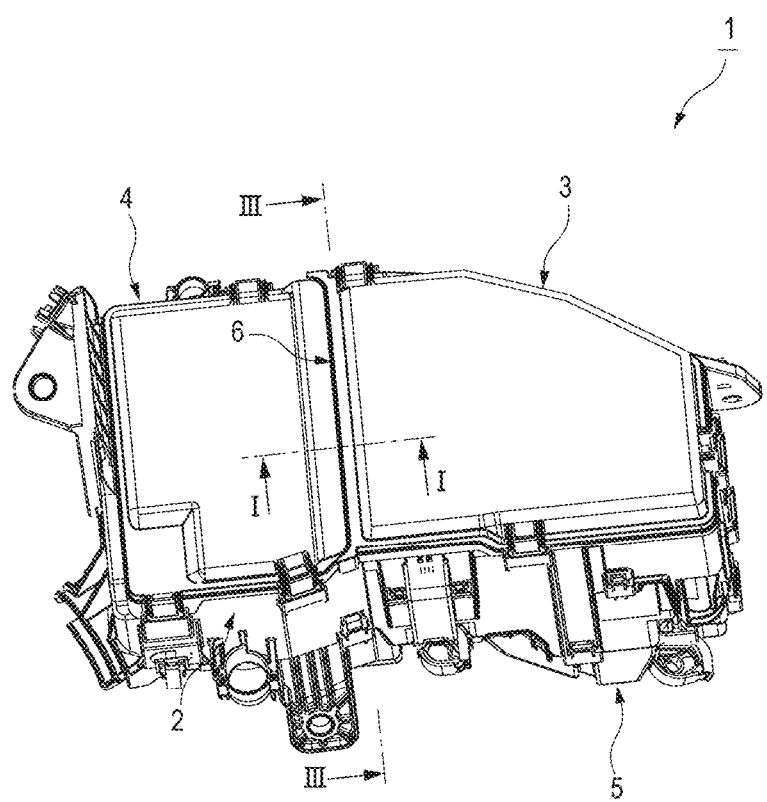
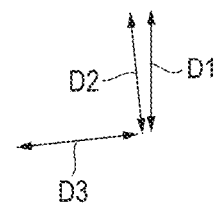

FIG.7
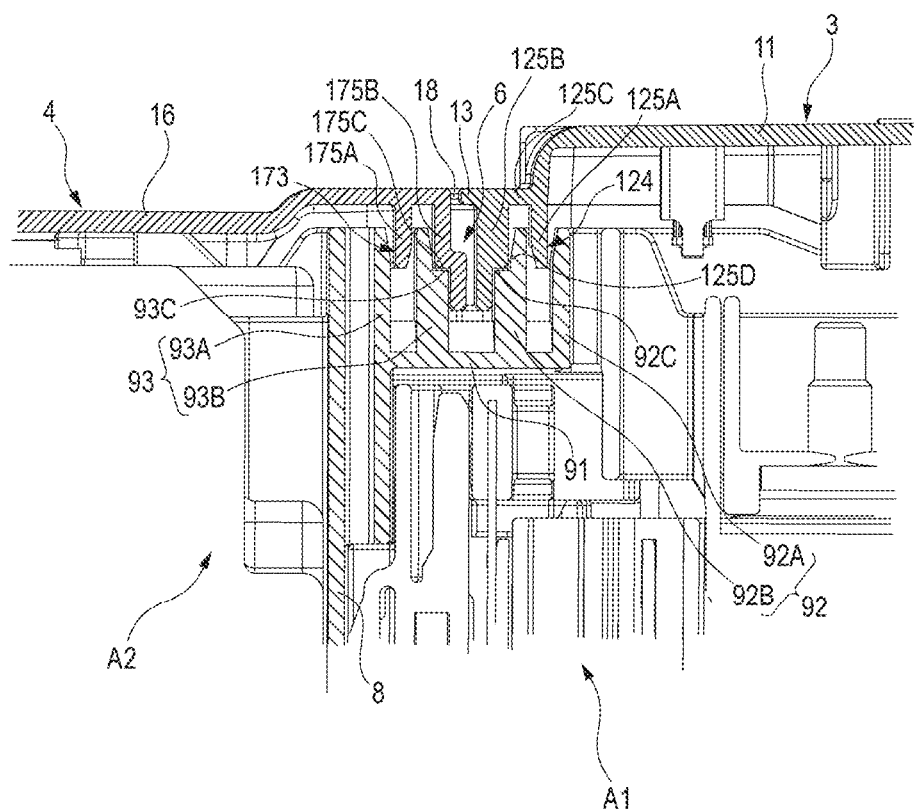
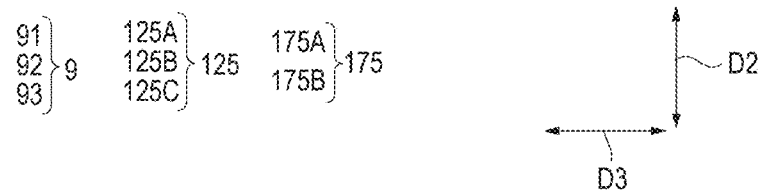

FIG.8
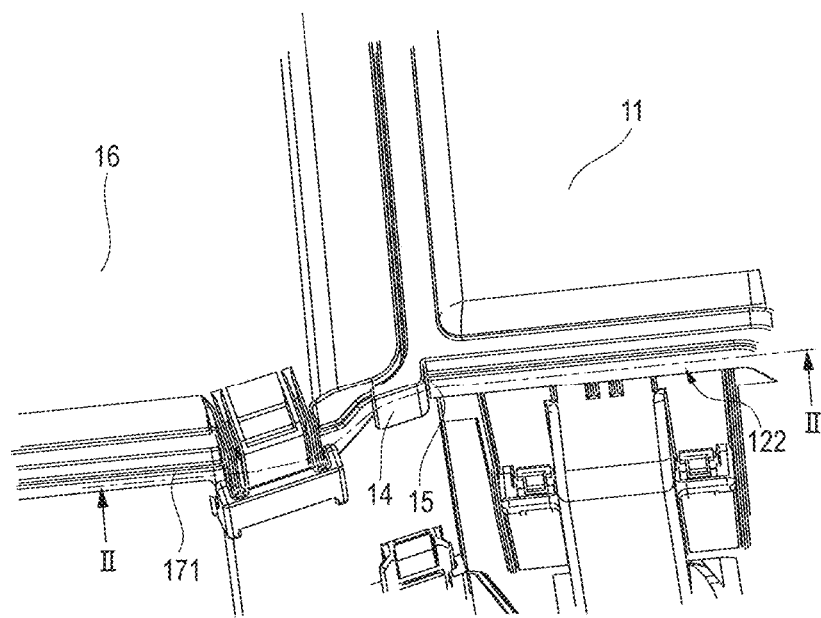
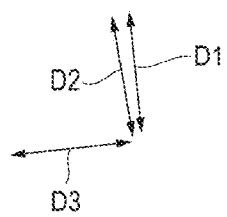

ELECTRIC CONNECTION BOX

CROSS-REFERENCE TO RELATED APPLICATIONS

This application is based on and claims priority under 35 USC 119 from Japanese Patent Application No. 2019-044085 filed on Mar. 11, 2019, the contents of which are incorporated herein by reference.

TECHNICAL FIELD

The present disclosure relates to an electric connection box such as a fuse box or a junction box.

BACKGROUND ART

The electric connection box includes a housing in which an electronic component such as a fuse is accommodated, and a lid portion that covers an opening of the housing. For example, as described in Patent Literatures 1 to 3, when an attachment box is attached to the electric connection box, a groove may be provided on a periphery of the lid portion.

For this reason, when water splashes on the electric connection box, the water accumulates in the groove, and the water may enter the housing from the periphery of the lid portion.

Patent Literature 1: JP2017022824A
Patent Literature 2: JP2013243858A
Patent Literature 3: JP2009213193A

SUMMARY OF INVENTION

The present disclosure relates to an electric connection box.

In accordance with an aspect of non-limiting embodiments of the present disclosure, an electric connection box includes a housing, a first lid portion, a groove, and a protrusion. The housing includes an opening. The first lid portion includes a first body wall that closes the opening of the housing and a first peripheral wall extending from a periphery of the first body wall toward the housing. The groove is provided between the first peripheral wall and a wall portion arranged to be spaced apart from the first peripheral wall. The groove includes an opening in a side of the first body wall in an extending direction of the first peripheral wall. The protrusion is provided on the first lid portion and protruding toward the wall portion. The protrusion covers the opening of the groove.

BRIEF DESCRIPTION OF DRAWINGS

FIG. 3 is a perspective view of the state in which the first and second upper covers are removed from the electric connection box of FIG. 1.

FIG. 6 is a perspective view of the electric connection box shown in FIG. 1.

FIG. 7 is a partial cross-sectional view taken along line I-I of FIG. 6.

FIG. 8 is a partially enlarged view of FIG. 6.

DESCRIPTION OF EMBODIMENTS

A specific embodiment will be described below with reference to the drawings.

Figure 1:
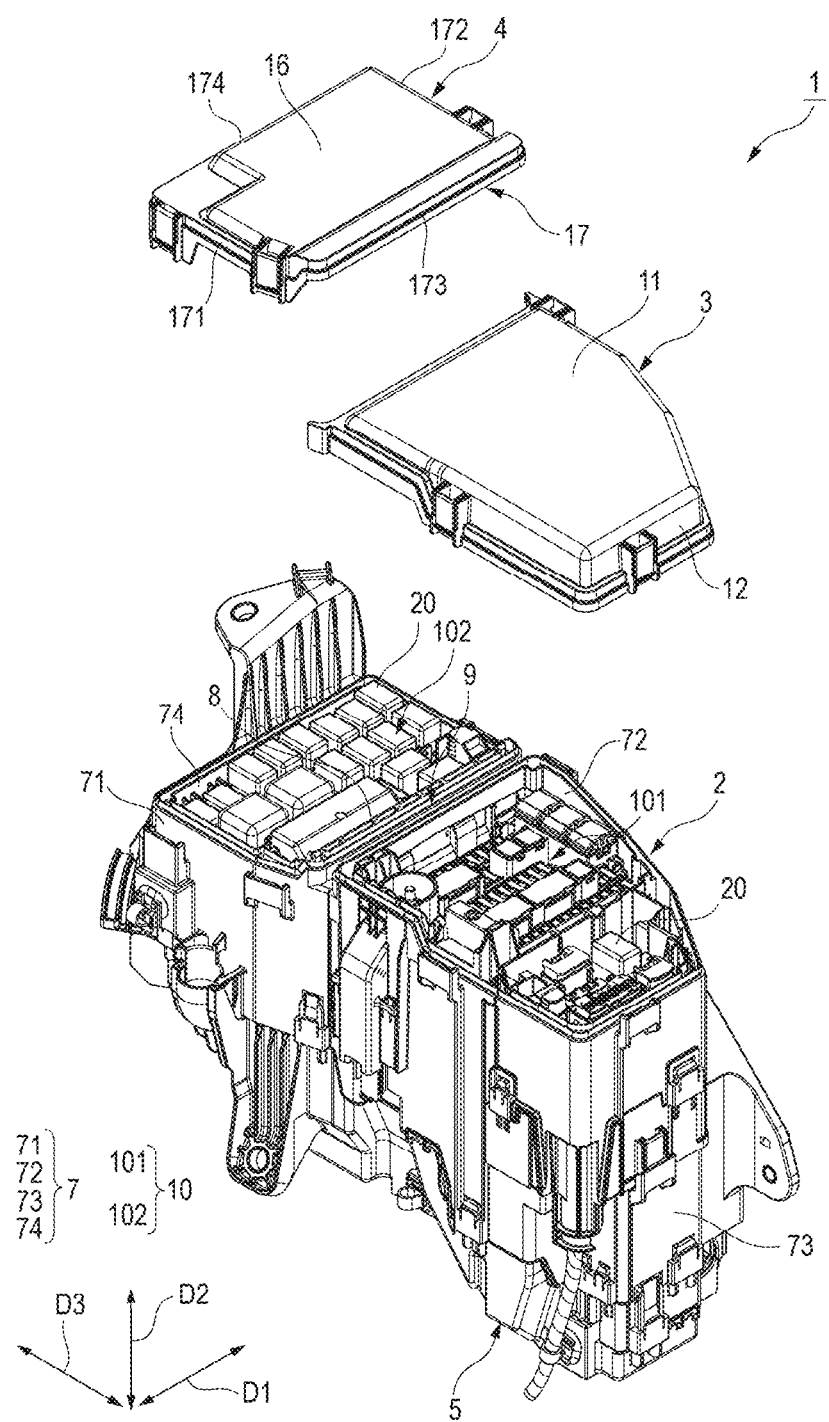
FIG. 1 is an exploded perspective view of an electric connection box according to an exemplary embodiment.
Figure 4:
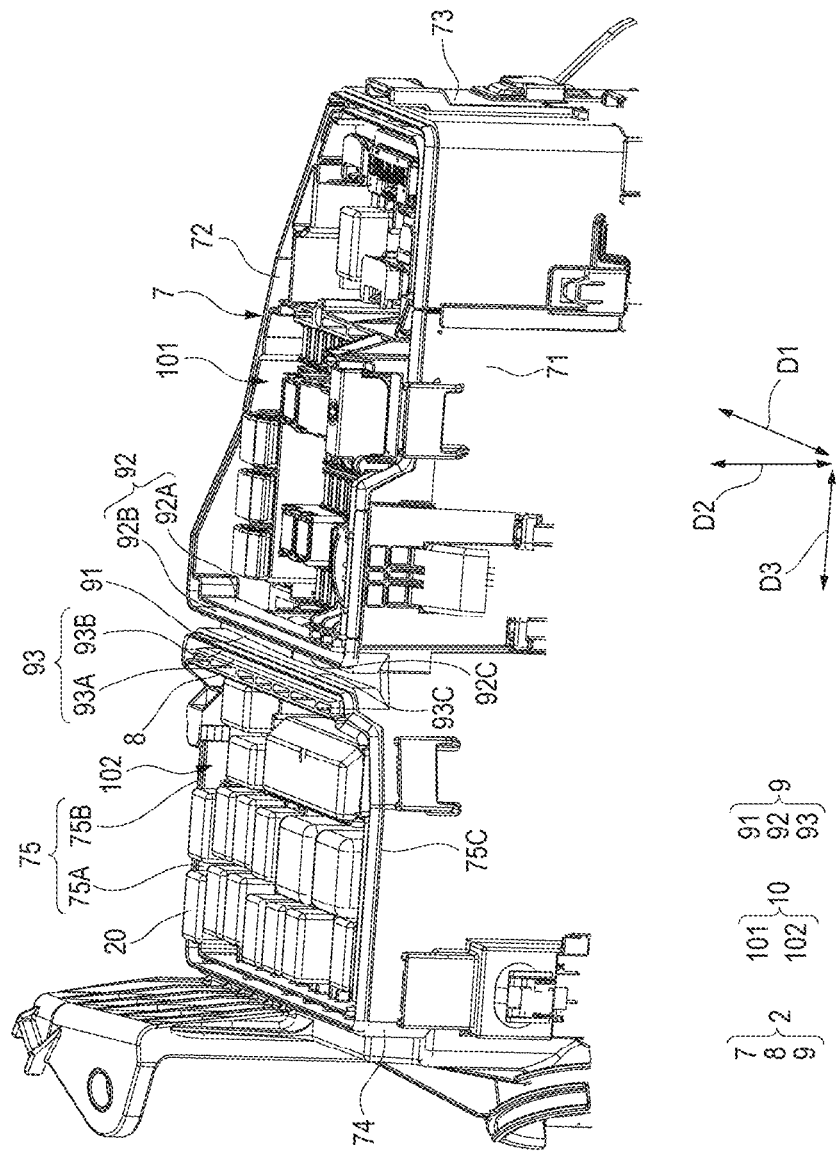
FIG. 4 is a partially enlarged view of FIG. 3.

An electric connection box 1 according to the present embodiment accommodates an electronic component 20 and is disposed in an engine room provided on a front side of a vehicle. As shown in FIG. 1 and the like, the electric connection box 1 includes a housing 2, a first upper cover 3 (first lid portion), a second upper cover (second lid portion) 4, and a lower cover 5. As shown in FIGS. 3 and 4, the housing 2 includes a cylindrical portion 7, a partition wall 8 which partitions the inside of the cylindrical portion 7 into two areas A1 and A2 (FIG. 7), and a partition portion 9 which partitions one opening 10 of the cylindrical portion 7 into two parts.

As shown in FIG. 4 and the like, the opening 10 of the cylindrical portion 7 is formed in a substantially rectangular cylindrical shape. As shown in FIG. 6 and the like, in a cylinder length direction, the one opening 10 is closed by the first upper cover 3 and the second upper cover 4, and the other opening (not shown) is closed by the lower cover 5. The cylinder length direction is arranged along an up-down direction D2 of the vehicle such that the opening 10 blocked by the first and second upper covers 3, 4 is directed upward, and the opening closed by the lower cover 5 is directed downward in the cylindrical portion 7. The cylindrical portion 7 is disposed in a manner that a longitudinal direction of the substantially rectangular opening 10 is along a front-rear direction D3 of the vehicle, and a short direction is along a left-right direction D1 of the vehicle.

Figure 2:
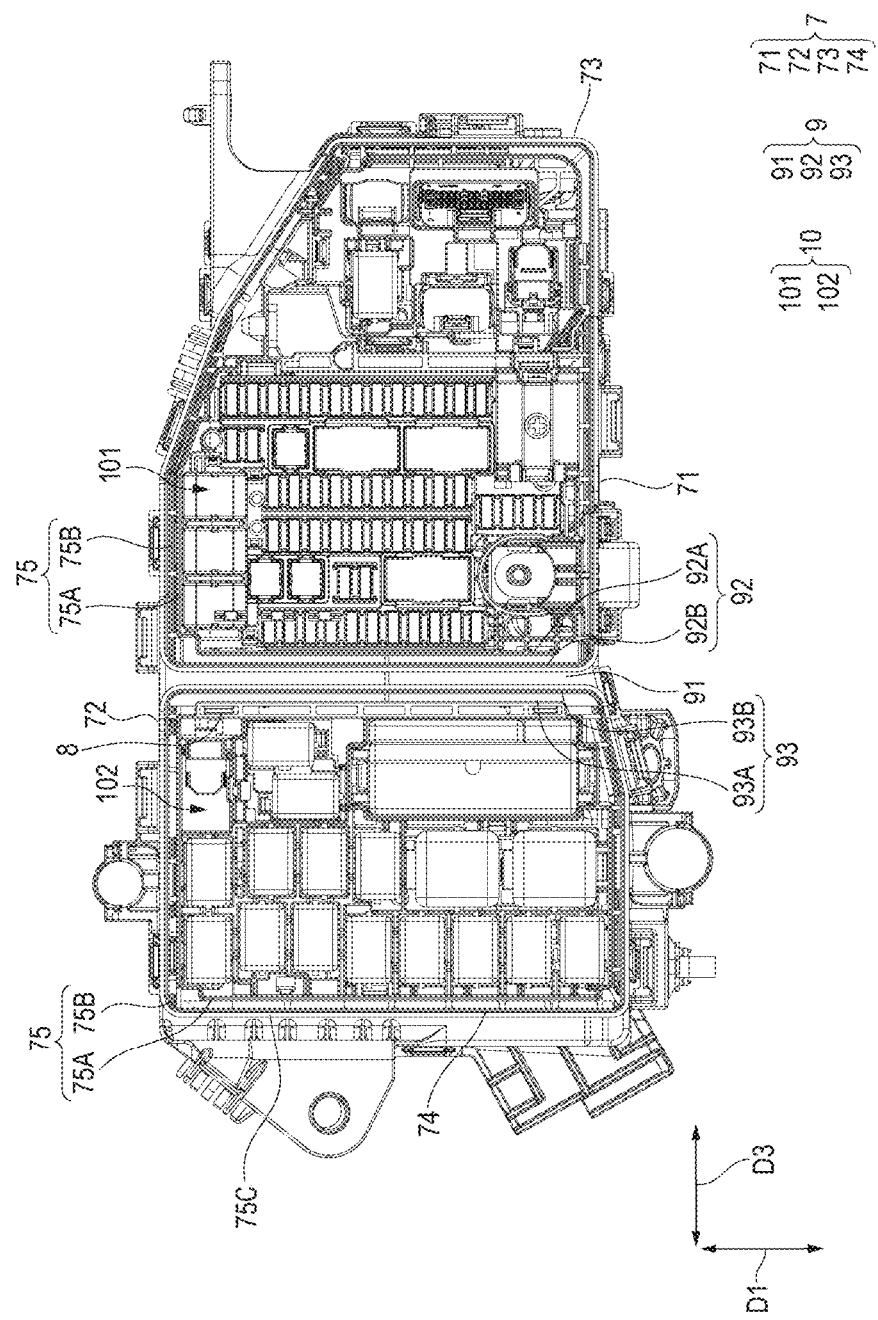
FIG. 2 is a top view of a state in which first and second upper covers are removed from the electric connection box of FIG. 1.

As shown in FIG. 1 and the like, the cylindrical portion 7 includes first and second side walls 71, 72 along the front-rear direction D3, and third and fourth side walls 73, 74 along the left-right direction D1. The third side wall 73 is connected between front ends of the first and second side walls 71, 72, and the fourth side wall 74 is connected between rear ends of the first and second side walls 71, 72, so that the cylindrical portion 7 is formed in the rectangular cylindrical shape. As shown in FIGS. 2 and 3, the cylindrical portion 7 is formed with a double wall 75 substantially over an entire periphery of an upper end portion thereof (except for a portion connected to the partition portion 9 described below). The double wall 75 includes an inner wall 75A disposed on an inner side and an outer wall 75B disposed on an outer side.

As shown in FIG. 7, the partition wall 8 is provided in the cylindrical portion 7 so as to be orthogonal to the front-rear direction D3, and two ends in the left-right direction D1 of the partition wall 8 are connected to the first and second side walls 71, 72 of the cylindrical portion 7. That is, the partition wall 8 partitions the inside of the cylindrical portion 7 into the two areas A1 and A2 which are arranged in the front-rear direction D3. In the present embodiment, among the two areas A1, A2, the area A1 on the front side of the front-rear direction D3 is a user maintenance area, and the area A2 on the rear side is a dealer maintenance area. The electronic component 20 whose maintenance is performed by a user is accommodated in the user maintenance area A1. The electronic component 20 whose maintenance is performed by a dealer is accommodated in the dealer maintenance area A2.

As shown in FIG. 7, the partition portion 9 is adjacent to a front side with respect to an upper end portion of the partition wall 8 in the front-rear direction D3. As shown in FIGS. 2 to 4, the partition portion 9 partitions the upper opening 10 of the cylindrical portion 7 into a first opening 101 and a second opening 102 arranged in the front-rear direction D3. In the present embodiment, the first opening 101 on the front side of the front-rear direction D3 is an opening for the user maintenance area A1, and the second opening 102 on the rear side is an opening for the dealer maintenance area A2. As shown in FIGS. 4 and 7, the partition portion 9 includes a bottom wall 91 and two double walls 92, 93. The bottom wall 91 is provided in a long shape in the left-right direction D1, and two ends thereof in the left-right direction D1 are connected to the first and second side walls 71, 72 of the cylindrical portion 7.

The two double walls 92, 93 extend upward from the bottom wall 91 and are arranged to be spaced apart in the front-rear direction D3. The two double walls 92, 93 include inner walls 92A, 93A and outer walls 92B, 93B respectively arranged in the front-rear direction D3. The inner wall 92A of the front double wall 92 is disposed on the front side while the outer wall 92B is disposed on the rear side. The outer wall 93B of the rear double wall 93 is disposed on the front side while the inner wall 93A is disposed on the rear side. The inner walls 92A, 93A and the outer walls 92B, 93B are provided in long shapes in the left-right direction D1 and are orthogonal to the front-rear direction D3.

Two ends of the inner wall 92A and the outer wall 92B of the front double wall 92 in the left-right direction D1 are connected to the inner wall 75A and the outer wall 75B on the front side of the partition portion 9 of the cylindrical portion 7. Two ends of the inner wall 93A and the outer wall 93B of the rear double wall 93 in the left-right direction D1 are connected to the inner wall 75A and the outer wall 75B on the rear side of the partition portion 9 of the cylindrical portion 7. As shown in FIG. 4, abutting surfaces 75C, 92C, 93C which are orthogonal to the up-down direction D2 are formed on the outer walls 75B, 92B, 93B of the cylindrical portion 7 and the partition portion 9 by making outer heights lower than inner heights substantially over the entire circumference. The abutting surfaces 75C, 92C, and 93C abut against the first and second upper covers 3, 4, which will be described below, so as to support the first and second upper covers 3, 4 in the up-down direction D2.

Figure 5A:
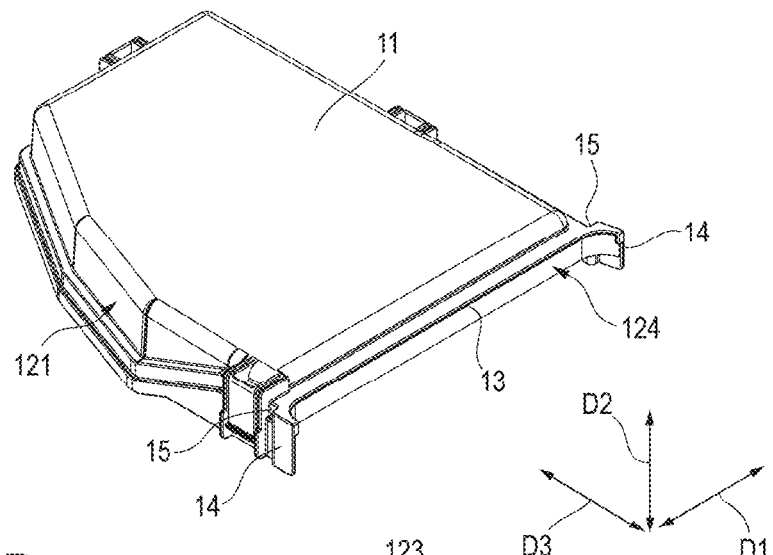
FIG. 5A is an upper perspective view of the first upper cover shown in FIG. 1.

The first upper cover 3 is attached to the cylindrical portion 7 so as to close the first opening 101. As shown in FIG. 5, the first upper cover 3 includes a first body wall 11 configured to close the first opening 101, and a first peripheral wall 12 extending from an entire periphery of the first body wall 11 toward the lower side of the up-down direction D2. The first body wall 11 has substantially the same size as the first opening 101, and is arranged to be orthogonal to the up-down direction D2.

The first peripheral wall 12 includes fifth and sixth side walls 121, 122 along the front-rear direction D3, and seventh and eighth side walls 123, 124 along the left-right direction D1. The seventh side wall 123 is connected between front ends of the fifth and sixth side walls 121, 122, and the eighth side wall 124 is connected between rear ends of the fifth and sixth side walls 121, 122. A double wall 125 is formed at a lower end portion of the first peripheral wall 12 over the entire circumference. The double wall 125 includes an inner wall 125A disposed on the inner inside, an outer wall 125B disposed on the outer side, and a connecting wall 125C (FIG. 7) connected between the inner wall 125A and the outer wall 125B.

As shown in FIG. 7, the inner wall 125A extends from a periphery of the first body wall 11. The connecting wall 125C extends from the vicinity of a center of the inner wall 125A in the up-down direction D2 toward an outer side, and the outer wall 125B extends from an outer edge of the connecting wall 125C toward the lower side.

As shown in FIGS. 5 and 7, an abutting surface 125D which abuts against the abutting surfaces 75C, 92C of the housing 2 and is orthogonal to the up-down direction D2 is formed on an inner side of the outer wall 125B. In the present embodiment, the abutting surface 125D is formed by making an inner height of the outer wall 125B provided on the eighth side wall 124 lower than an outer height thereof. Although not shown, a lower end of the outer wall 125B provided on the fifth to seventh side walls 121 to 123 is bent by 90 degrees outward. Further, the abutting surface 125D is formed by being bent by 90 degrees toward the lower end.

As shown in FIG. 1, the second upper cover 4 is attached to the cylindrical portion 7 so as to close the second opening 102. The second upper cover 4 includes a second body wall 16 configured to close the second opening 102, and a second peripheral wall 17 (wall portion) extending from an entire periphery of the second body wall 16 toward the lower side of the up-down direction D2. The second body wall 16 has substantially the same size as the second opening 102 and is arranged to be orthogonal to the up-down direction D2.

The second peripheral wall 17 includes ninth and tenth side walls 171, 172 along the front-rear direction D3, and eleventh and twelfth side walls 173, 174 along the left-right direction D1. The eleventh side wall 173 is connected between front ends of the ninth and tenth side walls 171, 172, and the twelfth side wall 174 is connected between rear ends of the ninth and tenth side walls 171, 172. As shown in FIG. 7, a double wall 175 is formed at a lower end portion of the second peripheral wall 17 over the entire circumference. The double wall 175 includes an inner wall 175A disposed on the inner side and an outer wall 175B disposed on the outer side.

An abutting surface 175C which abuts against the abutting surfaces 75C, 93C of the housing 2 and is orthogonal to the up-down direction D2 is formed on an inner side of the outer wall 175B. In the present embodiment, a lower end of the outer wall 175B is bent by 90 degrees outward. Further, the abutting surface 175C is formed by being bent by 90 degrees toward the lower end.

When the first upper cover 3 is attached to the housing 2, the inner wall 125A of the first upper cover 3 is arranged between the inner wall 92A and the outer wall 92B provided on the front side of the partition portion 9 (FIG. 7), and is arranged between the inner wall 75A and the outer wall 75B of the cylindrical portion 7 on the front side of the partition portion 9. The outer wall 125B of the first upper cover 3 is arranged on the outer side of the outer wall 92B provided on the front side of the partition portion 9 (FIG. 7), and is arranged on the outer side of the outer wall 75B of the cylindrical portion 7 on the front side of the partition portion 9. As shown in FIG. 7, the abutting surface 125D of the first upper cover 3 and the abutting surfaces 75C, 92C of the housing 2 abut against each other.

Accordingly, a path of water entering into the cylindrical portion 7 has a labyrinth structure that moves upward between the outer wall 125B of the first upper cover 3 and the outer walls 75B, 92B of the cylindrical portion 7 and the partition portion 9, moves downward between the outer walls 75B. 92B of the cylindrical portion 7 and the partition portion 9 and the inner wall 125A of the first upper cover 3, and then moves upward between the inner walls 75A, 92A of the cylindrical portion 7 and the partition portion 9 and the inner wall 125A of the first upper cover 3.

When the second upper cover 4 is attached to the housing 2, the inner wall 175A of the second upper cover 4 is arranged between the inner wall 93A and the outer wall 93B provided on the rear side of the partition portion 9 (FIG. 7), and is arranged between the inner wall 75A and the outer wall 75B of the cylindrical portion 7 on the rear side of the partition portion 9. The outer wall 175B of the second upper cover 4 is arranged on the outer side of the outer wall 93B provided on the rear side of the partition portion 9 (FIG. 7), and is arranged on the outer side of the outer wall 75B of the cylindrical portion 7 on the rear side of the partition portion 9. As shown in FIG. 7, the abutting surface 175C of the second upper cover 4 and the abutting surfaces 75C, 93C of the housing 2 abut against each other.

Accordingly, the path of the water entering into the cylindrical portion 7 has a labyrinth structure that moves upward between the outer wall 175B of the second upper cover 4 and the outer walls 75B. 93B of the cylindrical portion 7 and the partition portion 9, moves downward between the outer walls 75B, 93B of the cylindrical portion 7 and the partition portion 9 and the inner wall 175A of the second upper cover 4, and then moves upward between the inner walls 75A, 93A of the cylindrical portion 7 and the partition portion 9 and the inner wall 175A of the second upper cover 4.

According to the electric connection box 1 configured as described above, as shown in FIG. 7, the outer wall 125B of the eighth side wall 124 of the first upper cover 3 and the outer wall 175B of the eleventh side wall 173 of the second upper cover 4 face each other in the front-rear direction D3 on the bottom wall 91 of the partition portion 9. For this reason, a groove 6 is formed by the outer wall 125B of the eighth side wall 124 of the first upper cover 3, the outer wall 175B of the eleventh side wall 173 of the second upper cover 4, the outer walls 92B, 93B, and the bottom wall 91 of the partition portion 9.

As shown in FIG. 6, the groove 6 is formed in a long shape in the left-right direction D1, and includes an opening 18 (FIG. 7) and an opening 19 (FIG. 9) on the upper side of the up-down direction D2 (on the first body wall 11 side in an extending direction of the first peripheral wall 12) and two sides in the left-right direction D1 (longitudinal direction). For this reason, water may enter the housing 2 from edge portions of the first and second upper covers 3, 4 when the water in the electric connection box 1 is accumulated in the groove 6 when the engine room is subjected to high pressure cleaning, even though the labyrinth structure is formed.

The high pressure cleaning is generally performed by pouring water from the front side of the vehicle. For this reason, in the engine room, the water flows from the front to the rear of the vehicle. Therefore, in the present embodiment, as shown in FIG. 7, a rib 13 (protrusion) configured to prevent water from entering the groove 6 is provided in the first upper cover 3 on the front side of the vehicle, which is a front side in a direction in which the water flows. The rib 13 protrudes rearward from an upper end of the outer wall 125B of the first upper cover 3 so as to cover the upper opening 18 of the groove 6. That is, the rib 13 protrudes at the same height as the connecting wall 125C. In the present embodiment, the rib 13 of the first upper cover 3 covers the groove 6 from one end to the other end of the groove 6 in the longitudinal direction (left-right direction D1).

Figure 9:
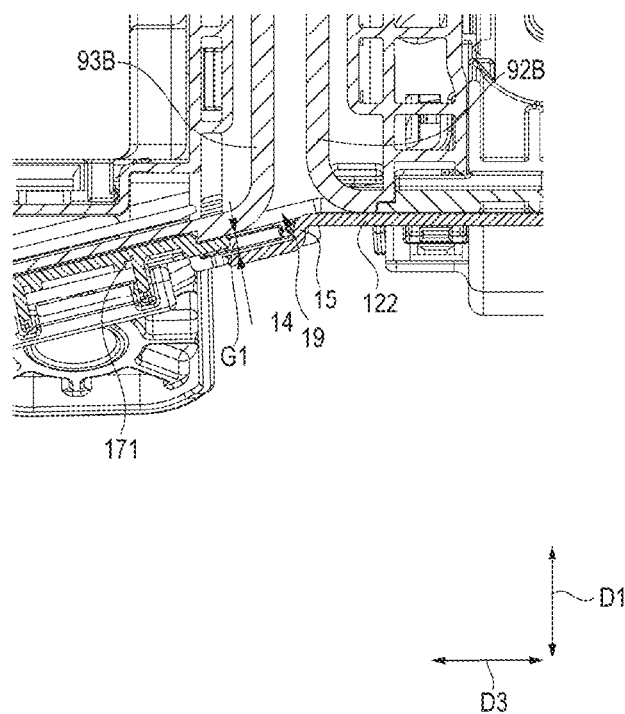
FIG. 9 is a partial cross-sectional view taken along line II-II of FIG. 8.

In the present embodiment, as shown in FIGS. 8 and 9, the first upper cover 3 is provided with a pair of water stop walls 14 which prevent water from entering the groove 6. The pair of water stop walls 14 is substantially orthogonal to the left-right direction D1 and protrudes rearward from the outer wall 125B of the fifth and sixth side walls 121, 122 so as to cover the opening 19 on the two sides in the left-right direction D1 of the groove 6. The water stop walls 14 are provided on outer sides in the left-right direction D1 with respect to two longitudinal direction (left-right direction D1) sides of the groove 6 and the outer wall 75B of the fifth and sixth side walls 121, 122. That is, rear ends of the water stop walls 14 and front ends of the fifth and sixth side walls 121, 122 are connected by a connecting wall 15 which is substantially orthogonal to the front-rear direction D3. The water stop walls 14 further cover front end portions of the ninth and tenth side walls 171, 172 of the second upper cover 4, in addition to the opening 19 on the two ends in the left-right direction D1 of the groove 6.

Figure 5B:
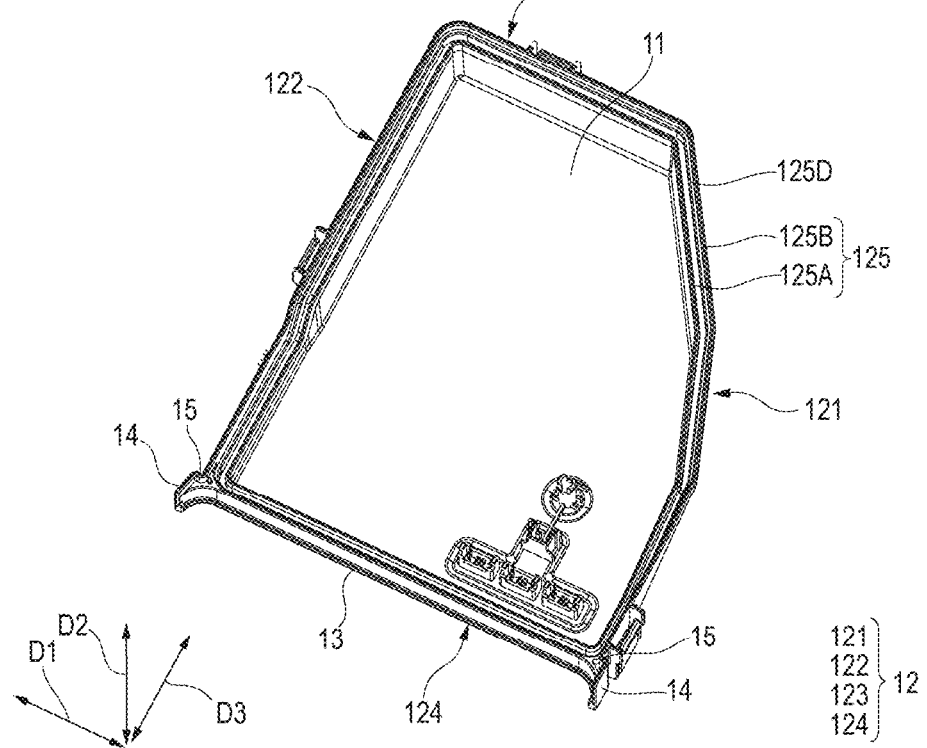
FIG. 5B is a lower perspective view of the first upper cover shown in FIG. 1.

As shown in FIG. 5B, the outer wall 125B of the eighth side wall 124 is bifurcated at two end portions in the left-right direction D1. One bifurcated outer wall 125B of the eighth side wall 124 is bent forward and connected to the outer wall 125B of the fifth and sixth side walls 121, 122. The other bifurcated outer wall 125B of the eighth side wall 124 is bent rearward and extends to rear ends of the water stop walls 14. The rib 13 protrudes from the outer wall 125B which extends to the water stop walls 14.

Figure 10:
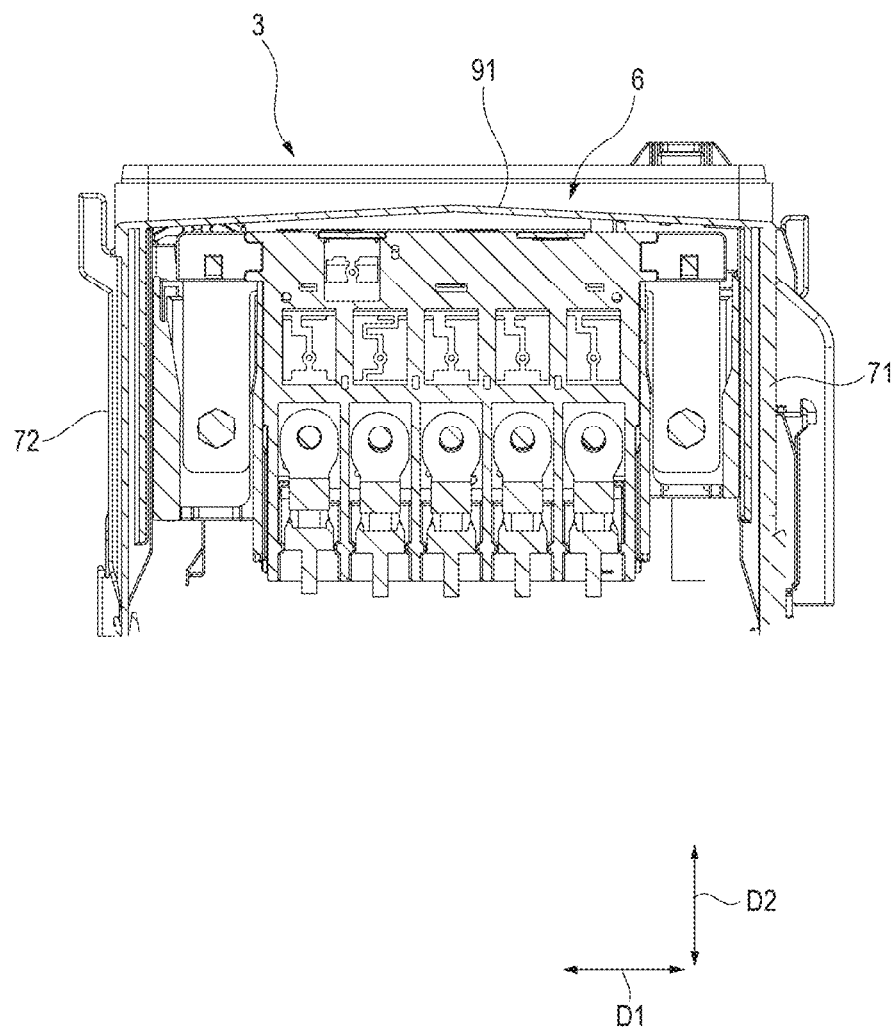
FIG. 10 is a partial cross-sectional view taken along line III-III of FIG. 6.

As shown in FIG. 10, an upper surface of the bottom wall 91, which serves as a bottom surface of the groove 6, is provided with an inclined surface that moves away from the first upper cover 3 as extending outward from a center of the left-right direction D1, that is, which is directed vertically downward.

According to the embodiment described above, the first upper cover 3 is provided with the rib 13 which protrudes toward the second peripheral wall 17 so as to cover the opening 18 provided on the upper side of the groove 6. Accordingly, as shown in FIG. 7, the water entering from the upper opening 18 is rebounded by the rib 13 in the groove 6, thus the water can be prevented from entering the groove 6 provided between the first upper cover 3 and the second upper cover 4. Even if the water enters the groove 6, momentum of the water can be reduced by the rib 13, so that the water can be prevented from entering the housing 2.

According to the embodiment described above, the electric connection box 1 is disposed in the engine room on the front side of the vehicle. The first peripheral wall 12 is disposed on the front side of the second peripheral wall 17. For this reason, when the engine room is cleaned by water from the front side of the vehicle, the water stop walls 14 can be provided on the first upper cover 3 which is disposed on the front side of the direction in which the water flows, and the water can be further prevented from entering the groove 6.

According to the embodiment described above, the first upper cover 3 is provided with the protruding water stop walls 14 which cover the opening 19 on the two sides in the left-right direction D1 of the groove 6. Accordingly, as shown in FIG. 8, water entering from the opening 19 on the two sides in the left-right direction D1 of the groove 6 can be rebounded by the water stop walls 14 to prevent the water from entering the groove 6.

According to the embodiment described above, the water stop walls 14 are provided on the outer sides in the left-right direction D1 with respect to the two ends of the groove 6 in the left-right direction D1. Accordingly, as shown in FIG. 8, a gap G1 can be formed between the water stop walls 14 and the opening 19 on the two ends of the groove 6 in the left-right direction D1, and water that has entered the groove 6 can be discharged from the gap G1.

According to the embodiment described above, the bottom wall 91 is provided with the inclined surface. Accordingly, as shown in FIG. 10, the water in the groove 6 easily flows toward the gap G1 between the water stop walls 14 and the opening 19 on the two ends of the groove 6 in the left-right direction D1, and the water that has entered the groove 6 is easily discharged from the gap G1 to the outside.

The present invention is not limited to the above-described embodiments and may be appropriately modified, improved, or the like. In addition, the material, shape, size, number, arrangement position, and the like of each component in the above-described embodiments are optional and are not limited as long as the present invention can be achieved.

According to the embodiment described above, the electric connection box 1 includes the first and second upper covers 3, 4, and the groove 6 is provided between the first and second upper covers 3, 4, the present invention is not limited thereto. For example, the electric connection box 1 may include one upper cover, a wall portion such as a bracket may be provided to face the first peripheral wall 12 of the upper cover, and the groove 6 may be provided between the first peripheral wall 12 and the wall portion such as the bracket.

According to the embodiment described above, the rib 13 is provided with a gap formed between the rib 13 and the twelfth side wall 174, the present invention is not limited thereto. The rib 13 may be extended to the upper side of an upper end of the twelfth side wall 174 to close the entire opening 18.

According to the embodiment described above, the electric connection box 1 is disposed in the engine room provided on the front side of the vehicle, and the first peripheral wall 12 is disposed on the front side of the vehicle with respect to the second peripheral wall 17, the invention is not limited thereto. In a case where the electric connection box 1 is disposed in an engine room provided on the rear side of the vehicle, the first peripheral wall 12 may be disposed on the rear side of the vehicle with respect to the second peripheral wall 17. In this case, the engine room is cleaned by water from the rear of the vehicle, and similarly to the above embodiment, the rib 13 can be provided on the first upper cover 3 disposed on the front side in the direction in which the water flows.

According to the embodiment described above, the water stop walls 14 are provided on the first upper cover 3, the present invention is not limited thereto. When sufficient waterproofing can be achieved only by the rib 13, the water stop walls 14 may not be provided.

In accordance with exemplary embodiments, the electric connection box may have configurations in the following [1] to [3].

[1] An electric connection box (1) includes: a housing (2), which is provided with an opening (10); and a first lid portion (3), which includes a first body wall (11) configured to close the opening (10) of the housing (2), and a first peripheral wall (12) extending from a periphery of the first body wall (11) toward the housing (2).

A groove (6) is formed between the first peripheral wall (12) and a wall portion (17) arranged to be spaced apart from the first peripheral wall (12).

A protrusion (13), which protrudes toward the wall portion (17) so as to cover an opening (18) provided in the groove (6) in a side of the first body wall (11) in an extending direction (D2) of the first peripheral wall (12), is provided in the first lid portion (3).

[2] The electric connection box (1) according to [1] further includes:

a second lid portion (4), which includes a second body wall (16) configured to close the opening (10) of the housing (2), and a second peripheral wall (17) extending from a periphery of the second body wall (16) toward the housing (2).

The second peripheral wall (17) forms the wall portion (17).

The groove (6) is formed between the first peripheral wall (12) and the second peripheral wall (17).

[3] The electric connection box (1) according to [1] or [2], in which the electric connection box (1) is disposed in an engine room provided on a front side of a vehicle.

The first peripheral wall (12) is disposed on a front side with respect to the wall portion (17) in a front-rear direction (D3) of the vehicle.

Alternatively, the electric connection box (1) is disposed in an engine room provided on a rear side of the vehicle.

The first peripheral wall (12) is disposed on a rear side with respect to the wall portion (17) in the front-rear direction (D3) of the vehicle.

According to the electric connection box having the above configuration [1], water entering from the opening of the first body wall side in the extending direction may be rebounded by the protrusion in the groove, thus the water can be prevented from entering the groove.

According to the electric connection box having the above configuration [2], the water can be prevented from entering the groove provided between the first lid portion and the second lid portion.

According to the electric connection box having the above configuration [3], the first peripheral wall portion is disposed at the front side or rear side with respect to the wall portion in the front-rear direction of the vehicle. For this reason, when the engine room is cleaned by water from the front side or the rear side of the vehicle, a protrusion can be provided on the first lid portion which is disposed on a front side of a direction in which the water flows with respect to the wall portion, and the water can be further prevented from entering the groove.

According to the exemplary embodiments, the electric connection box prevents water from entering the housing.

What is claimed is:

1. An electric connection box comprising: a housing including an opening; a first lid portion including a first body wall that closes the opening of the housing and a first peripheral wall extending from a periphery of the first body wall toward the housing; a groove provided between the first peripheral wall and a wall portion arranged to be spaced apart from the first peripheral wall, the groove including an opening in a side of the first body wall in an extending direction of the first peripheral wall; and a protrusion provided on the first lid portion and protruding toward the wall portion, wherein the protrusion covers the opening of the groove, wherein a protruding end surface of the protrusion is disposed to oppose a surface of the wall portion, the surface extending along the extending direction of the first peripheral wall and opposing the first peripheral wall, and wherein the groove includes a bottom wall provided with an inclined surface that extends away from the first lid portion.

2. The electric connection box according to claim 1, further comprising:
 a second lid portion including a second body wall that closes the opening of the housing, and a second peripheral wall extending from a periphery of the second body wall toward the housing,
 wherein the second peripheral wall forms the wall portion, and
 wherein the groove is provided between the first peripheral wall and the second peripheral wall.

3. The electric connection box of claim 1,
 wherein the opening is a first opening and the groove includes a second opening in the side of the first body wall in a longitudinal direction,
 wherein the first lid portion includes a stop wall that is orthogonal to the protrusion, and the stop wall protrudes toward the wall portion, and
 wherein the protrusion covers the first opening of the groove and the stop wall covers the second opening of the groove.

4. The electric connection box of claim 1,
 wherein the first peripheral wall extends along the first body wall in a first direction that is different from the extending direction, the opening of the groove extends along the first peripheral wall and the wall portion in the first direction, and the protrusion extends along the first peripheral wall in the first direction,
 wherein the wall portion is spaced apart from the first peripheral wall in a third direction that is different from the first direction and the extending direction, and
 wherein the protrusion covers the opening of the groove along the first direction and the third direction.

5. An electric connection box configured to be disposed in an engine room provided in one side of a vehicle in a front-rear direction of the vehicle, the electric connection box comprising: a housing including an opening; a first lid portion including a first body wall that closes the opening of the housing and a first peripheral wall extending from a periphery of the first body wall toward the housing; a groove provided between the first peripheral wall and a wall portion arranged to be spaced apart from the first peripheral wall, the groove including an opening in a side of the first body wall in an extending direction of the first peripheral wall; and a protrusion provided on the first lid portion and protruding toward the wall portion, wherein the protrusion covers the opening of the groove, wherein the first peripheral wall is disposed on the one side with respect to the wall portion in the front-rear direction of the vehicle, and wherein the groove includes a bottom wall provided with an inclined surface that extends away from the first lid portion.

6. The electric connection box of claim 5, further comprising:
 a second lid portion including a second body wall that closes the opening of the housing, and a second peripheral wall extending from a periphery of the second body wall toward the housing,
 wherein the second peripheral wall forms the wall portion, and
 wherein the groove is provided between the first peripheral wall and the second peripheral wall.

* * * * *